United States Patent [19]

Marrs

[11] Patent Number: 4,977,854
[45] Date of Patent: Dec. 18, 1990

[54] REMOTE DISPENSER FOR FISH ATTRACTANT

[76] Inventor: Thomas L. Marrs, R. R. 1, Box 59, Montrose, Ill. 62445

[21] Appl. No.: 243,254

[22] Filed: Sep. 12, 1988

[51] Int. Cl.⁵ ............................................. A01K 97/04
[52] U.S. Cl. .................... 118/683; 43/44.99; 118/300; 118/679; 118/682; 222/52; 239/67
[58] Field of Search .............. 118/676, 683, 300, 679, 118/682; 239/67, 578, 349, 70; 43/4, 25, 44.99; 222/52, 175

[56] References Cited

U.S. PATENT DOCUMENTS

| | | | |
|---|---|---|---|
| 2,583,660 | 1/1952 | Moore | 43/44.99 |
| 3,015,902 | 1/1962 | Mount | 43/7 |
| 3,262,609 | 7/1966 | Poitras | 222/175 |
| 3,273,752 | 9/1966 | Horeczky | 222/52 |
| 3,320,895 | 5/1967 | Peterson et al. | 222/333 |
| 3,327,901 | 6/1967 | Yerkovich | 222/333 |
| 3,403,818 | 10/1968 | Enssle | 222/175 |
| 3,434,628 | 3/1969 | Ceraldi | 222/52 |
| 3,612,353 | 10/1971 | Haase et al. | 222/52 |
| 3,650,435 | 3/1972 | Kleefeld | 222/52 |
| 3,798,823 | 3/1974 | Watters et al. | 43/23 |
| 3,929,259 | 12/1975 | Fegley et al. | 222/61 |
| 4,024,669 | 5/1977 | Fotis | 43/44.99 |
| 4,493,286 | 1/1985 | Carson | 118/676 |
| 4,722,372 | 2/1988 | Hoffman et al. | 222/52 |
| 4,763,434 | 8/1988 | Horneff | 43/44.99 |
| 4,801,088 | 1/1989 | Baker | 222/175 |

OTHER PUBLICATIONS

Page 51 from Cabela's Spring '88 Catalog.
Page 259 from Bass Pro Shops Spring '88 Catalog.

Primary Examiner—James C. Housel
Attorney, Agent, or Firm—Warren D. Flackbert

[57] ABSTRACT

A system for administering fish attractant to a lure at the tip of a fishing pole held by a fisherman through a nozzle outlet remote from the fisherman. The system includes a reservoir containing the fish attractant and a pump responsive to a switch controlled by the fisherman for transferring the fish attractant from the reservoir to the outlet. In a preferred embodiment the switch is a proximity switch responsive to movement of the fishing lure in front of the nozzle and the system includes a timing circuit for automatically returning the switch to its initial condition stopping the pump.

3 Claims, 2 Drawing Sheets

REMOTE DISPENSER FOR FISH ATTRACTANT

BACKGROUND OF THE INVENTION

1. Field of the Invention

The present invention relates to a remote dispenser for applying attractant to fishing bait.

2. Description of the Prior Art

Fish attractant is applied to artificial or live bait, and, when smelled by fish, induces a feeding response. Commercially available fish attractants are viscous and have a strong, unpleasant smell. In use, the fisherman, cranks the bait so that it dangles several feet from the rod tip. He then applies the attractant from a hand spray bottle, aerosol dispenser, squeeze bottle or by dipping the bait in the attractant or by rubbing it on with a rag. If the wind is blowing or if the boat is rocking, he may have trouble hitting the bait. It is also difficult for a fisherman to apply the attractant without spraying some it on his hands and clothing or boat and the operation results in lost time between casts.

In view of the above, there is need for a dispenser for dispensing fish attractant which is easy and quick to use and which dispenses the attractant on the bait without getting it on the fisherman, his clothes or boat. It is therefore an object of the present invention to provide such a dispenser. Other objects and features of the invention will be in part apparent and in part pointed out hereinafter.

The invention accordingly comprises the constructions hereinafter described and their equivalents, the scope of the invention being indicated in the subjoined claims.

SUMMARY OF THE INVENTION

In accordance with the present invention, fish attractant is applied through an outlet remote from the fisherman, preferably on the rail of a boat pointing outward, by a pump connected to a source of fish attractant. The flow of fish attractant through the outlet is initiated by a switch which activates the pump. After the desired amount of fish attractant has been applied, the switch is returned to its normal condition stopping the pump and flow of fish attractant from the outlet. In a preferred embodiment, the switch is a proximity switch which is located in the vicinity of the outlet. When a bait is near the outlet, the proximity switch activates the pump and fish attractant is dispensed through the outlet to the bait. To stop the flow of attractant, the proximity switch is returned to its normal condition by a timing device in series with the proximity switch for returning it to its normal condition after a preset time.

BRIEF DESCRIPTION OF THE DRAWINGS

In the accompanying drawings, in which one of various possible embodiments of the invention are illustrated, corresponding reference characters refer to corresponding parts throughout the several views of the drawings and in which.

DETAILED DESCRIPTION OF THE INVENTION

Figure 1:
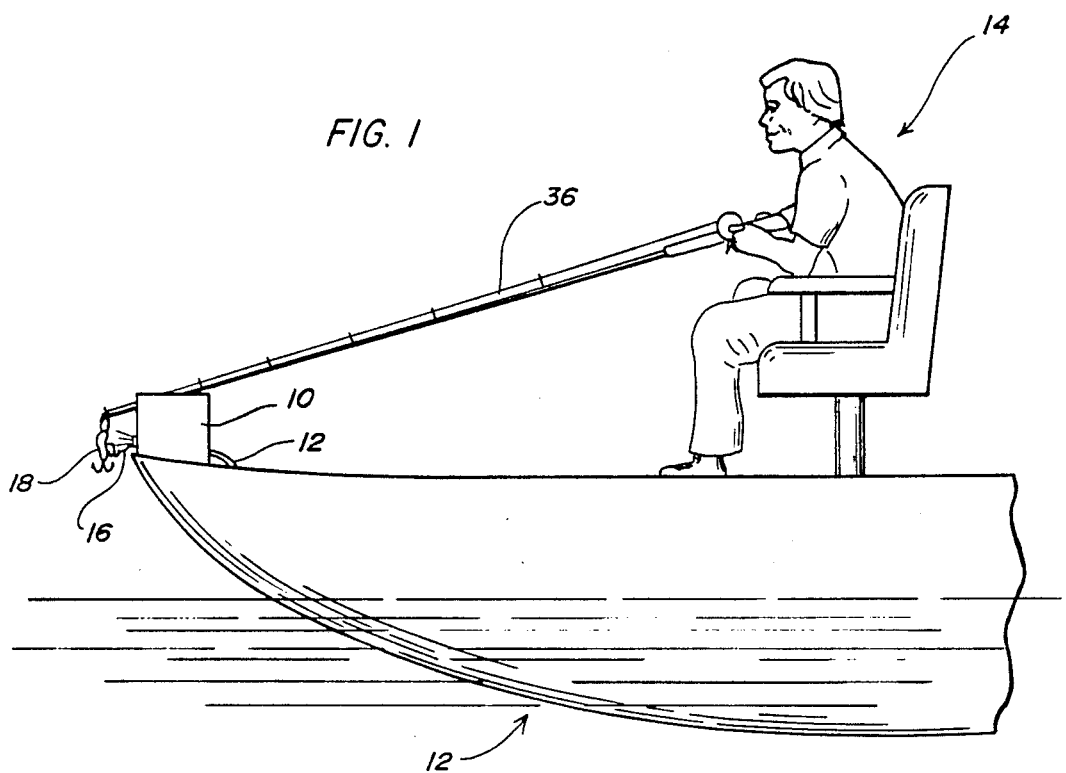
FIG. 1 is a side elevational view of a dispenser in use in accordance with the present invention mounted on the side rail of a boat.
Figure 2:
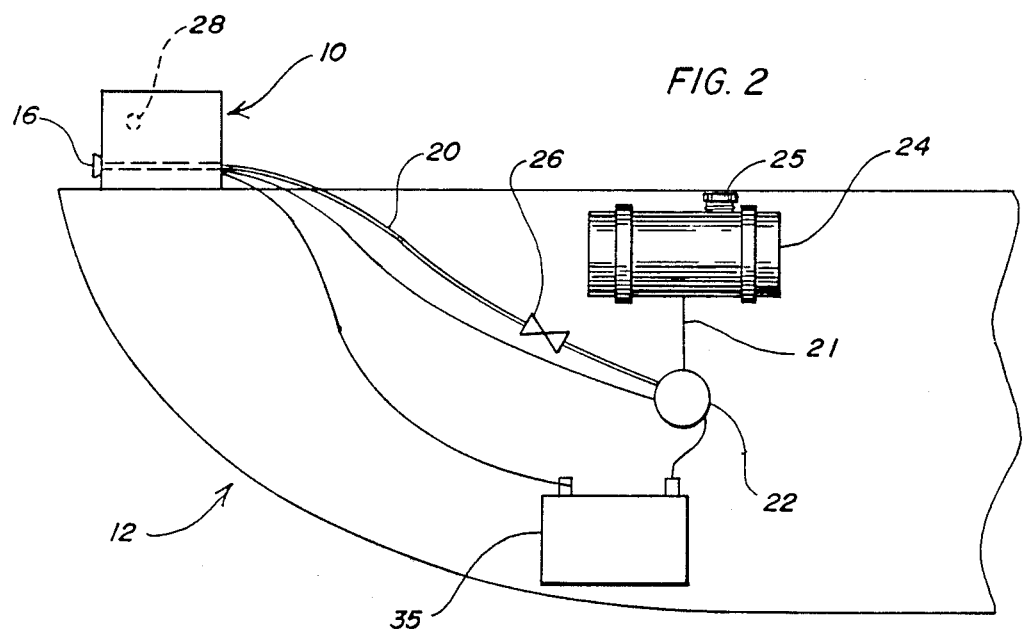
FIG. 2 is a side elevational view like FIG. 1 but with part of the side of the boat broken away.

Referring to the drawings more particularly by reference character, reference numeral 10 refers to a dispenser for fish attractant mounted on a side rail of a boat 12 remote from a fisherman 14 who may be seated or standing. An outlet or nozzle 16 is provided in the front of dispenser 10 for dispensing fish attractant to a bait 18 which is dangled in front of nozzle 16. As shown in FIG. 1, nozzle 16 is flowably connected by a first hollow line or transfer tube 20 to a pump 22 which is in communication through a second hollow line or transfer tube 21 with a tank or reservoir 24 in which fish attractant is kept. A screw cap 25 is provided in the top of reservoir 24 for filling the tank with fish attractant. A check valve 26 may be provided in transfer tube 20 to prevent backflow of fish attractant through pump 22.

Pump 22 is preferably a small electric motor but in other embodiments it may be an aerosol dispenser or the like, the principal limitation being that it be capable of transferring the fish attractant from reservoir 24 through transfer tubes 20 and 21 and out nozzle 16. A switch 28 is provided for activating pump 22. Switch 28 may be a push-button switch, radio frequency transmitter or the like located on the fisherman's pole or on the boat within easy reach. It is preferred, however, that it be a proximity switch and be located in the vicinity of nozzle 16. As shown in FIG. 1, switch 28 is located in a V-shaped slot 30 provided in the top of dispenser 10 and includes a light source 32 and a light sensitive detector 34.

Figure 3:
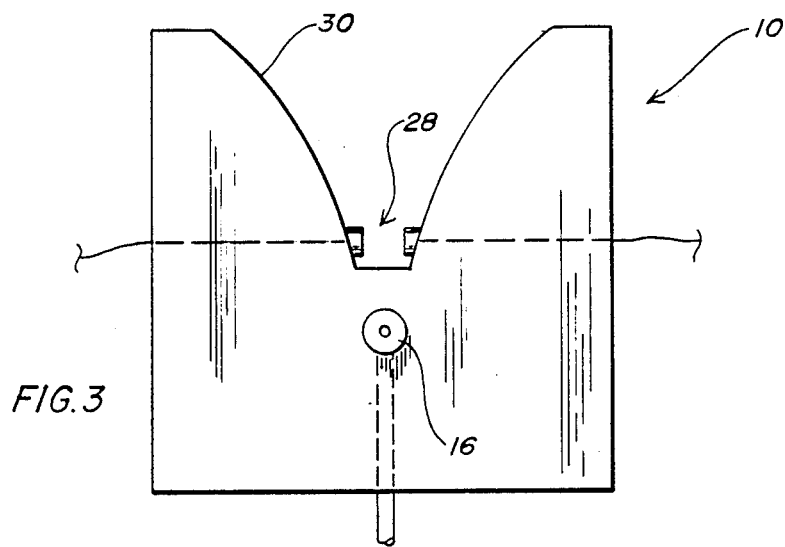
FIG. 3 is a front elevational view of the dispenser.
Figure 4:
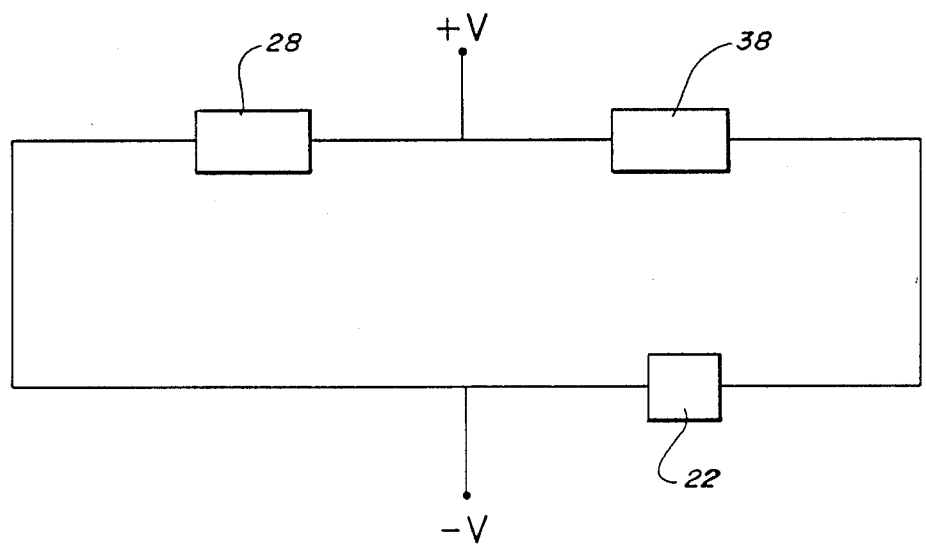
FIG. 4 is a schematic of an electrical circuit for the dispenser.

With reference to FIG. 3, the circuit enabling pump 22 is powered by a battery 35 or other source of electricity and when light source 32 is blocked as by the end of a fishing pole 36, switch 28 activates pump 22 and fish attractant is dispensed through nozzle 16 to bait 18. Switch 28 may be manually returned to its original condition after a sufficient quantity of attractant has been dispensed, however, it is preferred that a timing circuit 38 be provided in series with pump 22 such that pump 22 is returned after a preset interval of time. Other types of proximity switches such as a motion detector, a magnetic detector or the like may be used in place of the electric eye which is shown. When pump 22 is an aerosol package, reservoir 24 and transfer tube 21 are integral portions thereof and discharge of the aerosol dispenser may be controlled by a solenoid valve (not shown) which is responsive to switch 28 in the same manner as described above. For illustration, one dispenser 10 is connected to pump 22 but it will be understood that pump 22 and reservoir 24 can service multiple dispensers 10.

In use as illustrated in the drawings, fisherman 14 unscrews cap 25 and adds a volume of fish attractant to reservoir 24. He then reels the bait in and places the tip of fishing pole 36 in V-shaped slot 30 with bait 18 dangling in front of nozzle 16. Fishing pole 36 blocks the passage of light from light source 32 to light sensitive detector 34 triggering switch 28 to activate pump 22. Pump 22 then pumps fish attractant out of reservoir 24 though transfer tubes 21 and 20 to nozzle 16 where it is sprayed on bait 18. After a predetermined interval, timing circuit 38 returns switch 28 to its original condition at the beginning of the duty cycle stopping pump 22. Fish attractant is thereby administered efficiently and waste is minimized without getting the attractant on the fisherman, his clothes or boat.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A system for administering fish attractant to a fishing lure at the tip of a fishing pole remote from a fisherman holding the pole comprising a reservoir containing fish attractant, a spray nozzle for depositing said fish attractant onto said fishing lure in a direction away from said fisherman, and pumping means responsive to a switch controlled by said fisherman transferring said fish attractant through a transfer tube connecting said reservoir and said spray nozzle, wherein said switch is located in the vicinity of said spray nozzle and is a proximity switch activated by said fishing pole when said fishing lure is dangled near said spray nozzle by said fisherman, wherein said spray nozzle includes a slot portion in which said proximity switch is located, and wherein said spray nozzle is disposed beneath and directed away from said slot portion.

2. The system of claim 1 wherein said proximity switch is an electric eye.

3. The system of claim 1 wherein said pumping means is an integral part of an aerosol package.

* * * * *